(12) United States Patent
Li

(10) Patent No.: US 12,011,919 B2
(45) Date of Patent: Jun. 18, 2024

(54) LABEL PRINTER AND LABEL PRINTING METHOD FOR PRECISE POSITIONING THEREOF

(71) Applicant: Beijing Supvan Electronic Technology Co., Ltd., Beijing (CN)

(72) Inventor: Jianguo Li, Beijing (CN)

(73) Assignee: Beijing Supvan Electronic Technology Co., Ltd., Beijing (CN)

( * ) Notice: Subject to any disclaimer, the term of this patent is extended or adjusted under 35 U.S.C. 154(b) by 159 days.

(21) Appl. No.: 17/709,460

(22) Filed: Mar. 31, 2022

(65) Prior Publication Data

US 2023/0140754 A1 May 4, 2023

(30) Foreign Application Priority Data

Oct. 28, 2021 (CN) .......................... 202111266785.3

(51) Int. Cl.
*B41J 17/22* (2006.01)
*B41J 3/407* (2006.01)

(52) U.S. Cl.
CPC ............. *B41J 17/22* (2013.01); *B41J 3/4075* (2013.01)

(58) Field of Classification Search
None
See application file for complete search history.

(56) References Cited

U.S. PATENT DOCUMENTS 5,536,092 A * 7/1996 Yamaguchi ............ B41J 3/4075
400/231

* cited by examiner

*Primary Examiner* — Alejandro Valencia
(74) *Attorney, Agent, or Firm* — Bayramoglu Law Offices LLC

(57) ABSTRACT

A label printer and a label printing method for precise positioning thereof are provided. The label printer includes an outer shell and a label cartridge arranged inside the outer shell, a power mechanism and a control mechanism configured to control paper output of the label cartridge and winding and unwinding of a carbon ribbon, and a print head configured to realize label printing. An inner space of the label cartridge is reasonably planed, and a linear label paper output channel and a label rollback release space are arranged, thereby ensuring smoothness of paper feeding and paper rollback, and preventing label paper from wrinkling in a rollback process. A gear transmission system is improved to realize forward and reverse rotation of gears relying on the same electric motor. A photoelectric sensor with its own reflecting prism is arranged to reduce an occupied space of the label cartridge.

15 Claims, 6 Drawing Sheets

LABEL PRINTER AND LABEL PRINTING METHOD FOR PRECISE POSITIONING THEREOF

CROSS REFERENCE TO THE RELATED APPLICATIONS

This application is based upon and claims priority to Chinese Patent Application No. 202111266785.3, filed on Oct. 28, 2021, the entire contents of which are incorporated herein by reference.

TECHNICAL FIELD

The present disclosure relates to the field of label printers, and in particular, to a forward and reverse label printer and a label printing method for precise positioning thereof.

BACKGROUND

At present, in thermal transfer label printers, a carbon ribbon moves with label paper in a same direction, that is, a paper output direction. After printing, the label paper is torn off or cut off. At this time, a certain length of blank label is left between a heating line of a print head and a cutting position of the label paper, and the blank label is not printed. Meanwhile, the carbon ribbon that follows the blank label is not utilized. The label paper with the certain length and the carbon ribbon cannot be utilized in the next printing, thus leading to waste and causing low material utilization and high costs.

The label cartridge in the existing label printer is internally equipped with a roll of label paper, mainly including continuous label paper and die-cut label paper. For different types of label stickers, the label paper is wound into rolls in different ways in the industry. The existing label printers have not solved the problem of wrinkling after the label stickers are printed, resulting in the wrinkling and folding of the surface of the label paper output by the printer after printing. This affects the use of the label, and may cause the label itself to wrinkle and stick together to fail to be used.

Moreover, in order to realize accurate printing of the die-cut label paper, it is necessary to accurately detect a spacing between die-cut label surface papers. The existing methods for detecting the spacing between die-cut label surface papers generally use a photoelectric sensor. The existing photoelectric sensor includes a transmitting terminal and a receiving terminal respectively arranged on both sides of the label sticker. In this case, the face-to-face arrangement of the transmitting terminal and the receiving terminal requires a large space, and the cost is high, which becomes an obstacle to the miniaturization of the label cartridge.

It can be seen that there are still inconveniences and defects in the structure, method and use of the above existing label printers, which need to be further improved. There is an urgent need to create a new label printer and a label printing method for precise positioning thereof in the industry, which can realize forward output of the label paper and take-up of the carbon ribbon, and reverse rollback of the label paper and rollback of the carbon ribbon to reduce waste of the label paper and the carbon ribbon, prevent the label paper from wrinkling and sticking in the process of paper feeding and paper rollback, ensure the label printing effect, and ensure the accuracy of label printing.

SUMMARY

A technical problem to be solved by the present disclosure is to provide a label printer, such that forward paper output of label paper and take-up of a carbon ribbon can be realized, and reverse rollback of the label paper and rollback of the carbon ribbon can be realized to reduce waste of the label paper and the carbon ribbon, prevent the label paper from wrinkling and sticking in the process of paper feeding and paper rollback, ensure the label printing effect, and ensure the accuracy of label printing, thereby overcoming defects of an existing label printer.

In order to solve the above technical problems, the present disclosure provides a label printer, including an outer shell and a label cartridge arranged inside the outer shell, a power mechanism and a control mechanism configured to control paper output of the label cartridge and winding and unwinding of a carbon ribbon, and a print head configured to realize label printing.

The label cartridge includes an inner shell and a label paper output channel and a carbon ribbon channel that are arranged inside the inner shell. An interior of the inner shell is divided into a first half area and a second half area. A label paper roll is provided at a lower part of the first half area, and a label rollback release space is reserved at an upper part of the first half area. A carbon ribbon supply roll and a carbon ribbon take-up roll are provided at a lower part of the second half area, and a groove configured to place the print head is provided at an upper part of the second half area. The label paper output channel is arranged along an uppermost end of the second half area, and is in linear correspondence with a paper output port on a side wall of the inner shell and a side wall of the outer shell. The carbon ribbon channel is arranged around the groove, and the carbon ribbon at an open end of the groove is tightly attached to a label paper.

The power mechanism includes an electric motor and a gear transmission system. The gear transmission system includes a first gear set in transmission connection with an output shaft of the electric motor. A planetary gear set in transmission connection with the first gear set, a printing rubber roll gear set being in transmission connection with the planetary gear set and configured to drive the label paper to move forward or reversely, and a carbon ribbon winding gear and a carbon ribbon unwinding gear that are selectively in transmission connection with the planetary gear set. The planetary gear set includes a sun gear, a planetary gear meshed with the sun gear, and a planetary carrier connecting the sun gear and the planetary gear. The sun gear is driven by the first gear set to drive the planetary gear to rotate, and under the action of the planetary carrier, the planetary gear is meshed with the carbon ribbon winding gear or the carbon ribbon unwinding gear based on forward rotation or reverse rotation of the sun gear.

The printing rubber roll gear set in the gear transmission system is connected to a printing rubber roll. The printing rubber roll drives, through friction with the label paper, the label paper to move. The carbon ribbon winding gear is connected to the carbon ribbon take-up roll, and the carbon ribbon unwinding gear is connected to the carbon ribbon supply roll. When the electric motor rotates to one side, the first gear set transmits power to the planetary gear set, and the planetary gear set drives the printing rubber roll and the carbon ribbon take-up roll to rotate to realize output of the label paper and take-up of the carbon ribbon. When the electric motor rotates to an opposite side, the first gear set transmits reverse power to the planetary gear set, and the planetary gear set drives the printing rubber roll and the carbon ribbon supply roll to rotate to realize rollback of the label paper and recovery of the carbon ribbon.

With further improvement, the label paper output channel may be linearly arranged along an inner side of the side wall of the inner shell. The groove may be arranged at an acute angle with the side wall. The print head arranged inside the groove may be in inclined contact with the carbon ribbon.

With further improvement, a support baffle configured to separate the first half area and the second half area may be arranged inside the inner shell. An upper part of the support baffle may be set as a concave arc-shaped guide plate with at least two protrusions. Each of the label paper output channel and the carbon ribbon channel may be provided with a plurality of support columns or support rollers.

With further improvement, the label paper may use a continuous label paper roll or a die-cut label paper roll, and a label surface paper side of the continuous label paper roll or the die-cut label paper roll may be at least in contact with one of arc-shaped protrusion segments of the concave arc-shaped guide plate.

With further improvement, the continuous label paper roll may be wound into a roll with continuous label surface paper facing outward, and a continuous label surface paper side of the continuous label paper roll may be in contact with each of the arc-shaped protrusion segments of the concave arc-shaped guide plate in sequence.

The die-cut label paper roll may be wound into a roll with a die-cut label surface paper facing inward, and a die-cut label surface paper side of the die-cut label paper roll may be in contact with one of the arc-shaped protrusion segments of the concave arc-shaped guide plate.

With further improvement, the planetary gear set may be further provided with an elastic limit mechanism. The elastic limit mechanism may include an elastic limit member and a limit rod abutting against the elastic limit member. One end of the elastic limit member may be connected to a rear of the planetary carrier, and the other end of the elastic limit member may pop out to an outer side of the planetary carrier to form a certain tension with the planetary carrier. The limit rod may be fixed on the outer shell. When the electric motor is stopped, the elastic limit member may urge the planetary gear to be meshed with the carbon ribbon winding gear under the interference of the limit rod.

With further improvement, torsion springs rotating in opposite directions may be respectively arranged inside the carbon ribbon winding gear and the carbon ribbon unwinding gear, and sawteeth configured to control rotation of the roll may be provided inside each of a spindle of the carbon ribbon supply roll and a spindle of the carbon ribbon take-up roll.

With further improvement, a photoelectric sensing mechanism configured to detect a label and a cutter configured to cut a label base paper after printing may be arranged inside the outer shell. The photoelectric sensing mechanism, the print head, and the cutter may be arranged on the label paper output channel in sequence. A distance between the photoelectric sensing mechanism and the print head may be less than or equal to a length of a single die-cut label, and a set distance between the print head and the cutter may be a sum of a spacing between die-cut labels and a minimum margin of label printing minus a distance from a label cutting end to a rear end of the die-cut label.

With further improvement, the photoelectric sensing mechanism may include a photoelectric sensor with a transmitting terminal and a receiving terminal on a same side of the label paper, and a reflecting prism arranged on the other side of the label paper. After passing through the label paper vertically, a light beam emitted by the transmitting terminal of the photoelectric sensor may be reflected by the reflecting prism, then pass through the label paper vertically, and be received by the receiving terminal to detect a label surface paper.

With further improvement, the label printer may be configured for printing of die-cut label paper rolls, continuous label paper rolls, heat shrinkable tube rolls, or labeling strip rolls.

As another improvement of the present disclosure, the present disclosure further provides a label printing method for precise positioning of a label printer, using the above label printer, and including the following steps:

controlling, by the label printer, the die-cut label to output a paper forward at a constant speed; calculating, by the control mechanism, a time t1 when a front end of the die-cut label reaches the print head according to a label paper output rate, calculating a time t2 when a printing starting position of the die-cut label reaches the print head, and calculating a time t3 required by a sum of a distance from the front end of the die-cut label to the rear end of the die-cut label and a distance from the label cutting end to the rear end of the die-cut label; and when the front end of the die-cut label in a paper output direction is detected by the photoelectric sensing mechanism, starting timing; and at a time t1+t2, controlling the print head to start a printing action, continuing to output the paper after printing is completed, starting timing when the front end of the die-cut label is detected, and controlling the cutter to perform a cutting action at the time t3.

The label printing method may further include: in a process of printing the die-cut label by the print head, simultaneously detecting, by the photoelectric sensing mechanism, a front end position of the next die-cut label, and repeating the above printing action and cutting action when the front end position of the next die-cut label is detected.

With such a design, the present disclosure has at least the following advantages:

1. The present disclosure reasonably plans the inner space of the shell of the label cartridge, arranges a linear label paper output channel inside the shell, and arranges a label rollback release space, which can not only ensure the convenience and smoothness of paper feeding and paper rollback without jamming, but also releases space for the label paper to prevent the label paper from wrinkling or folding in the rollback process. The carbon ribbon supply roll and the carbon ribbon take-up roll are arranged inside the shell, such that the winding and unwinding structure is compact, the carbon ribbon path is compact, and the space utilization is high, which provides the possibility of implementation for small label cartridges.

2. Through the setting of the meshing relationship between the gears, the gear transmission system of the label printer of the present disclosure can realize forward and reverse rotation of the gears relying on the same electric motor, and can selectively control the carbon ribbon winding gear or the carbon ribbon unwinding gear to rotate as a driving wheel, which can not only realize the normal printing of the label paper, but also roll back the label paper to the label cartridge, and recover the carbon ribbon into the label cartridge, avoiding the waste of the label paper and the carbon ribbon and improving the material utilization.

3. By arranging the internal structure of the label cartridge for different label winding methods, the label sticker can be effectively rolled in the advancing state, and the wrinkling of the label surface paper can be overcome. At the same time, due to the arrangement of the release space in the state of label unwinding, the folding and wrinkling of the label sticker during rollback is also avoided, and the printing quality and printing effect of the label are improved.

4. Through the arrangement of the elastic limit mechanism and the interference fit between the elastic limit member and the limit rod, when the electric motor is stopped, the elastic limit member urges the planetary gear to be meshed with the carbon ribbon winding gear to ensure the instantaneity during forward printing.

5. The torsion springs rotating in opposite directions are arranged inside the carbon ribbon winding gear and the carbon ribbon unwinding gear to ensure that in the process of taking up the carbon ribbon forward and winding the carbon ribbon reversely, the carbon ribbon can always have a certain tension, such that the carbon ribbon will not wrinkle.

6. In the label cartridge of the present disclosure, the photoelectric sensor with its own reflecting prism is arranged, which greatly reduces the occupied space of the photoelectric sensing mechanism on the basis of satisfying the photoelectric detection, provides favorable conditions for arranging a miniaturized and convenient label cartridge, and reduces the cost of the label cartridge.

7. By limiting the positions of the photoelectric sensing mechanism, the print head, and the cutter, and by improving the setting of the printing method for precise positioning, the precise positioning of the printing starting position of the die-cut label and the precise positioning of the cutting position of the cutter can be realized, such that the position of the printed content on each die-cut label is precise, and the cutter will not cut the label surface paper when cutting the die-cutting label. The method is simple with convenient and reliable operation and low cost.

8. The label printer of the present disclosure has the advantages of simple structure, precise and reliable printing, good effect, and wide application range.

BRIEF DESCRIPTION OF THE DRAWINGS

The above is only an overview of the technical solutions of the present disclosure. In order to understand the technical means of the present disclosure more clearly, the present disclosure will be further described in detail below with reference to the accompanying drawings and specific embodiments.

DETAILED DESCRIPTION OF THE EMBODIMENTS

Figure 1:
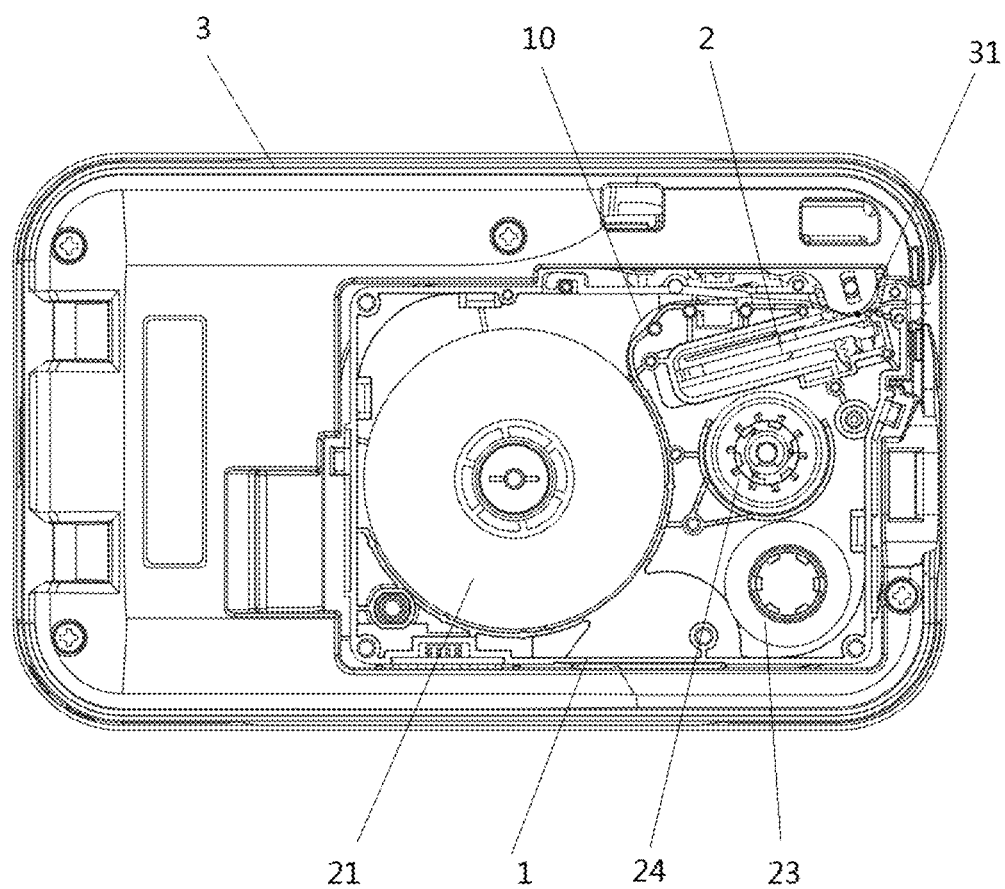
FIG. 1 is a schematic structural diagram of a label printer of the present disclosure.

With reference to FIG. 1, the present embodiment relates to a label printer, including an outer shell 3 and a label cartridge 1 arranged inside the outer shell 3, a power mechanism and a control mechanism configured to control paper output of the label cartridge and winding and unwinding of a carbon ribbon, and a print head 2 configured to realize label printing.

Figure 2:
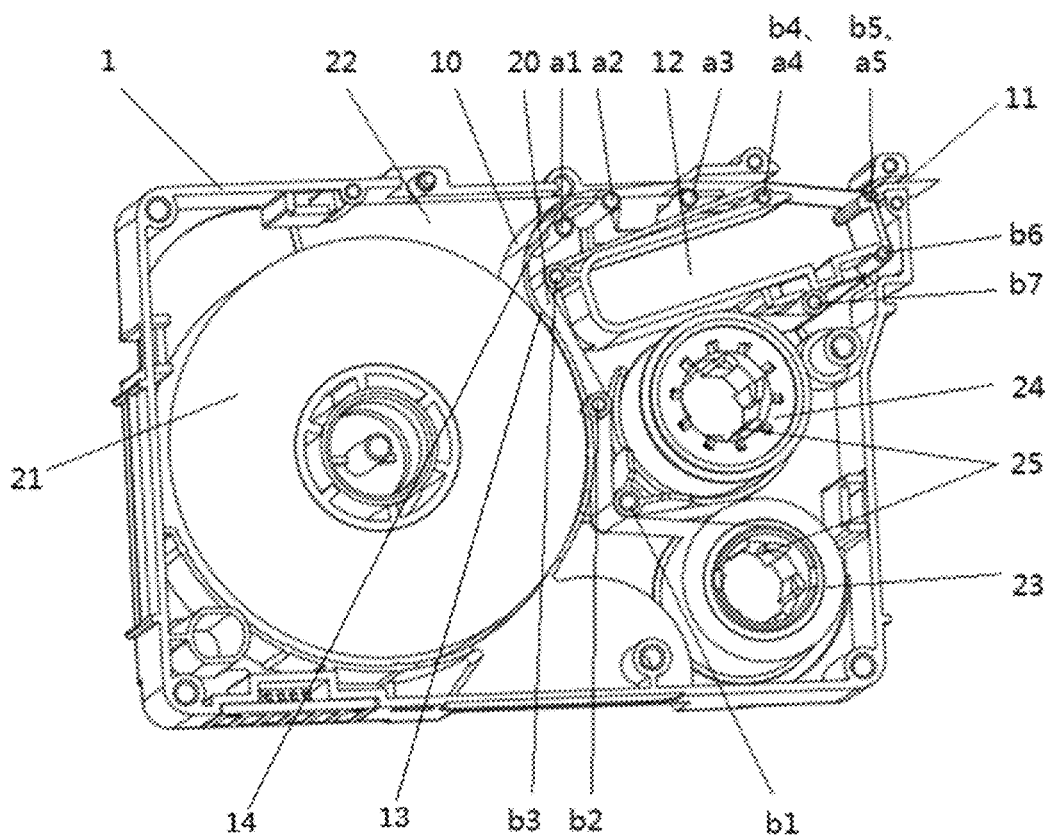
FIG. 2 is a schematic diagram of an internal structure of a paper label cartridge of the label printer of the present disclosure.

Specifically, as shown in FIG. 2, in the present embodiment, the label cartridge 1 includes a shell and a label paper output channel and a carbon ribbon channel that are arranged inside the shell. The label paper output channel is arranged in near linear correspondence with a paper output port 11 of the shell. A groove 12 configured to place the print head 2 is formed in the shell. An open end of the groove 12 is arranged close to the paper output port 11. The carbon ribbon channel is arranged around the groove 12, and the carbon ribbon 20 at the open end of the groove is tightly attached to a label paper 10, such that the print head 2 can print the label by thermal transfer.

In the present embodiment, the shell of the label cartridge is a nearly square shell, and an interior of the square shell is divided into a first half area and a second half area that are distributed on left and right. A label paper roll 21 is provided at a lower part of the first half area, and a label rollback release space 22 is reserved at an upper part of the first half area. A carbon ribbon supply roll 23 and a carbon ribbon take-up roll 24 are provided at a lower part of the second half area, and the groove 12 is provided at an upper part of the second half area. The groove 12 is arranged at a certain angle with an upper side wall of the shell, such as the acute angle setting in FIG. 2, such that the print head 2 arranged inside the groove 12 is in inclined contact with the carbon ribbon 20, which is conducive to realizing a linear channel for the label paper output channel. The paper output port 11 is formed at an upper part of a vertical side wall of the second half area. The label paper output channel is arranged along an uppermost end of the second half area and parallel to the upper side wall of the shell, and is in linear correspondence with the paper output port 11. A printing rubber roll 31 is arranged on an opposite side of the print head 2, and is configured to drive the label paper through friction with the label paper 10. In this way, the arrangement of the linear label paper output channel and the label rollback release space provides a reliable guarantee for the rollback of the label paper 10, which can not only realize smooth rollback of the label paper under the action of the printing rubber roll, but also provide a release space for the rollback of the label paper to prevent the label paper from wrinkling and folding after the rollback to affect the printing effect of the label paper.

Each of the label paper output channel and the carbon ribbon channel is provided with a plurality of support columns or support rollers, such that the label paper 10 and the carbon ribbon 20 always have a certain tension in an advancing or rollback process to ensure smooth operation. As shown in FIG. 2, the label paper output channel is provided with support columns a1, a2, a3, a4, and a5, and the carbon ribbon channel is provided with support rollers b1, b2, b3, b4, b5, b6, and b7.

In the present embodiment, a support baffle 13 configured to separate the first half area and the second half area is arranged inside the shell of the label cartridge. An upper part of the support baffle 13 is set as a concave arc-shaped guide plate configured to roll the label paper 10. At least two protrusions 14 are formed in the concave arc-shaped guide plate, such as a crescent-shaped plate structure, which can make the label paper 10 continuously rolled by the arc-shaped protrusions 14 for many times in the advancing process to ensure the fit between the label surface paper and base paper, and improve the printing effect.

In addition, sawteeth 25 configured to control rotation of the roll are provided inside each of a spindle of the carbon ribbon supply roll 23 and a spindle of the carbon ribbon take-up roll 24. The sawteeth 25 can realize the rotation of the roll manually and electrically. When the carbon ribbon take-up roll 24 rotates as a driving wheel, the carbon ribbon supply roll 23 acts as an idle wheel, which is conducive to forward take-up of the carbon ribbon 20. When the carbon ribbon supply roll 23 rotates as a driving wheel, the carbon ribbon take-up roll 24 acts as an idler wheel, which is conducive to reverse take-up of the carbon ribbon 20.

Referring to FIG. 3 to FIG. 7, in the present embodiment, the power mechanism includes an electric motor 4 and a gear transmission system. The gear transmission system includes a first gear set in transmission connection with an output shaft of the electric motor, a planetary gear set in transmission connection with the first gear set, a printing rubber roll gear set being in transmission connection with the planetary gear set and configured to drive the label paper to move forward or reversely, and a carbon ribbon winding gear and a carbon ribbon unwinding gear that are selectively in transmission connection with the planetary gear set.

Figure 3:
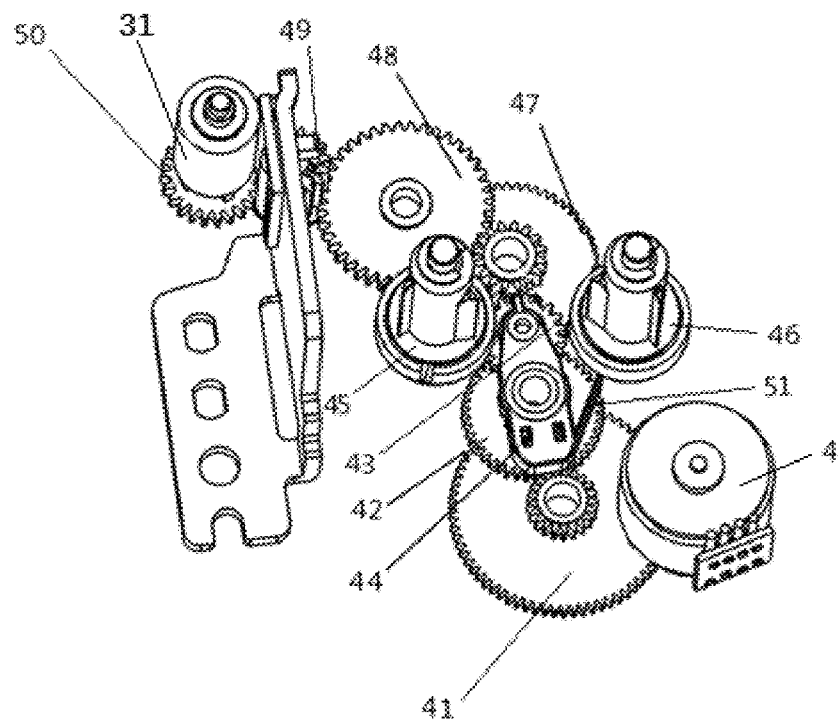
FIG. 3 is a schematic structural diagram of meshing of a planetary gear and a carbon ribbon winding gear in a gear transmission system of the label printer of the present disclosure.

Specifically, as shown in FIG. 3, the first gear set includes a first gear 41, and the first gear 41 uses a duplex gear. An external gear of the duplex gear is meshed with the output shaft of the electric motor, and is driven to rotate by it. At the same time, an internal gear of the duplex gear also rotates accordingly.

The duplex gears in the present embodiment can all use two gears on the same central axis, or consist of a plurality of gears that are meshed with each other.

Figure 4:
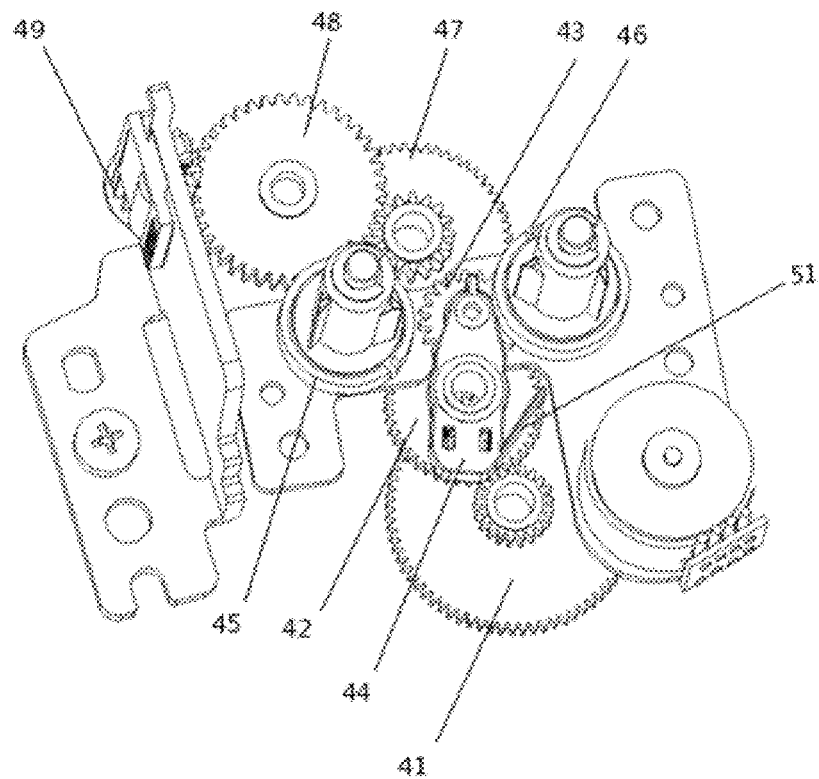
FIG. 4 is a schematic structural diagram of meshing of the planetary gear and a carbon ribbon unwinding gear in the gear transmission system of the label printer of the present disclosure.

In the present embodiment, the planetary gear set includes a sun gear 42, a planetary gear 43 meshed with the sun gear, and a planetary carrier 44 connecting the sun gear 42 and the planetary gear 43. The planetary gear 43 is rotatably installed on the planetary carrier 44 and revolves around the sun gear 42. The sun gear 42 also uses a duplex gear, and includes an external gear meshed with the internal gear of the first gear 41 and an internal gear meshed with the planetary gear 43, and then the sun gear 42 is driven by the first gear 41 to drive the planetary gear 43 to rotate. The planetary gear 43 also revolves around the sun gear 42. The planetary gear 43 can be selectively meshed with the carbon ribbon winding gear 45 or the carbon ribbon unwinding gear 46. When the planetary gear 43 drives the carbon ribbon winding gear 45 to rotate, the carbon ribbon unwinding gear 46 acts as an idle wheel, and the carbon ribbon winding gear 45 drives the carbon ribbon 20 to take up, as shown in FIG. 3. When the planetary gear 43 drives the carbon ribbon unwinding gear 46 to rotate, the carbon ribbon winding gear 45 acts as an idle wheel, and the carbon ribbon unwinding gear 46 drives the carbon ribbon 20 to roll back, as shown in FIG. 4.

In the present embodiment, the printing rubber roll gear set includes a gear 47, a gear 48, a gear 49, and a gear 50 that are meshed in sequence. The gear 47 also uses a duplex gear, and includes an external gear meshed with the external gear of the sun gear 42, and an internal gear meshed with the gear 48. The gear 48 is also meshed with the gear 49, and the gear 49 is meshed with the gear 50. Then, the gear 47 is driven by the sun gear 42 to drive the gear 48 to rotate, and then drive the gear 49 and the gear 50 to rotate.

When the above power mechanism acts on the label cartridge 1, specific connections are as follows.

The printing rubber roll gear set in the gear transmission system is connected to the printing rubber roll 31 inside the outer shell 3, and the printing rubber roll 31 drives the label paper 10 relying on friction with the label paper 10. The carbon ribbon winding gear 45 is connected to the sawteeth inside the carbon ribbon take-up roll 24. The carbon ribbon unwinding gear 46 is connected to the sawteeth inside the carbon ribbon supply roll 23. When the electric motor 4 rotates to one side, the first gear 41 transmits power to the planetary gear set, and the planetary gear set drives the printing rubber roll 31 to rotate forward through the printing rubber roll gear set, and simultaneously controls the carbon ribbon take-up roll 24 to rotate to realize forward output of the label paper 10 and forward take-up of the carbon ribbon 20. When the electric motor 4 rotates to an opposite side, the first gear 41 transmits reverse power to the planetary gear set, and the planetary gear set also drives the printing rubber roll 31 to rotate reversely through the printing rubber roll gear set, and simultaneously controls the carbon ribbon supply roll 23 to rotate to realize reverse rollback of the label paper 10 and reverse recovery of the carbon ribbon 20. The gear transmission system that can drive the label printer to reverse is conducive to rolling back the label paper 10 and the carbon ribbon 20 that have exceeded the heating line of the print head but are not utilized, such that they can be rolled back to the front end of the heating line of the print head, which is conducive to making full use of the unused label paper 10 and carbon ribbon 20 to reduce material waste.

In the present embodiment, the planetary gear set is further provided with an elastic limit mechanism, configured to keep the planetary gear 43 meshed with the carbon ribbon winding gear 45 when the electric motor 4 is stopped to ensure the instantaneity of the take-up of the carbon ribbon 20 during forward printing.

Specifically, the elastic limit mechanism includes an elastic limit member 51 and a limit rod 52 abutting against the elastic limit member. One end of the elastic limit member 51 is connected to a rear of the planetary carrier 44, and the other end of the elastic limit member 51 pops out to the outer side of the planetary carrier 44 to form a certain tension with the planetary carrier 44. The limit rod 52 is fixed on the outer shell 3 of the printer. When the electric motor 4 is stopped, the elastic limit member 51 keeps the planetary gear 43 meshed with the carbon ribbon winding gear 45 under the interference of the limit rod 52, which can drive the starting of the carbon ribbon winding gear 45 in time to ensure the instantaneity of the take-up of the carbon ribbon.

Figure 5:
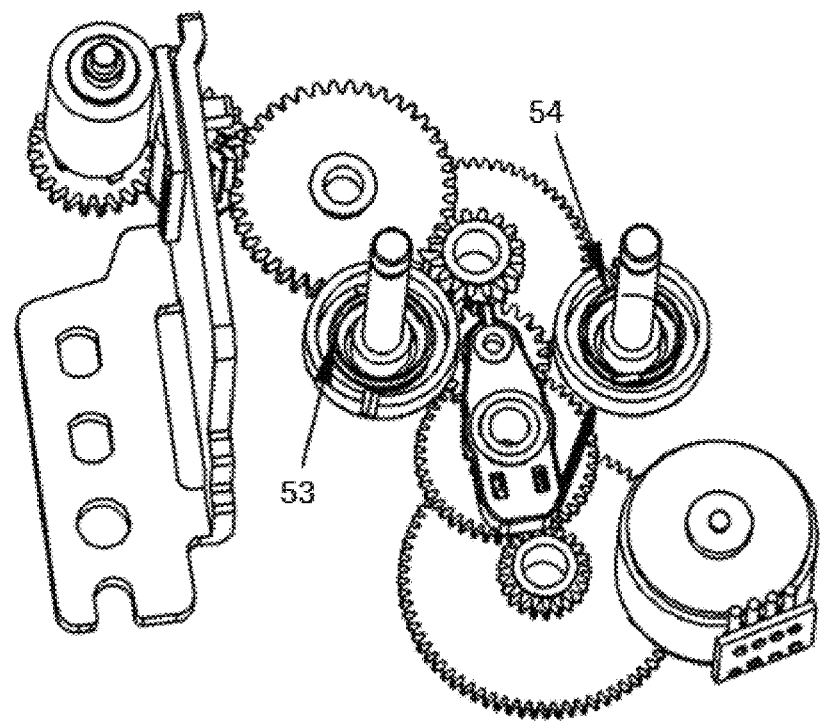
FIG. 5 is a schematic diagram of an internal structure of the carbon ribbon winding gear and the carbon ribbon unwinding gear in the gear transmission system of the label printer of the present disclosure.
Figure 6:
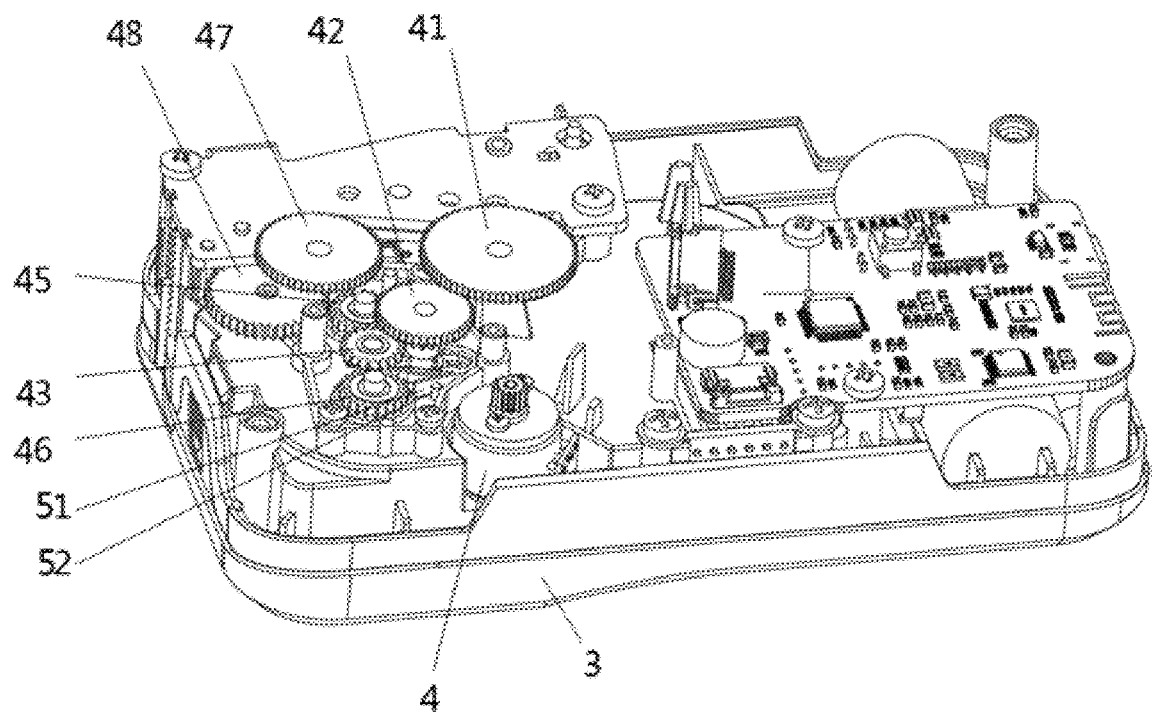
FIG. 6 is a schematic diagram of an internal structure of the label printer of the present disclosure (a gear 41 and a gear 47 are in a non-meshing state for clear display in the figure)
Figure 7:
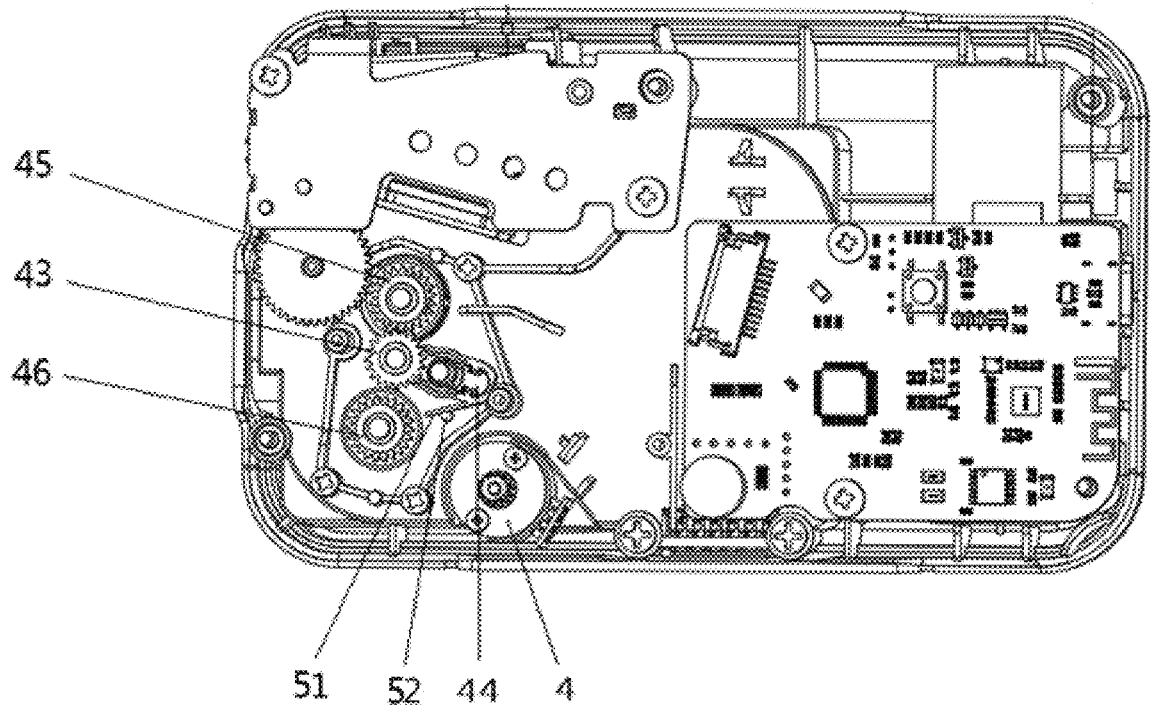
FIG. 7 is a top view of the internal structure of the label printer of the present disclosure (the gear 41, a gear 42, and the gear 47 are hidden for clear display in the figure)

In addition, as shown in FIG. 5, torsion springs 53 and 54 rotating in opposite directions are respectively arranged inside the carbon ribbon winding gear 45 and the carbon ribbon unwinding gear 46. The torsion springs 53 and 54 can ensure that in the process of taking up the carbon ribbon forward and winding the carbon ribbon reversely, the carbon ribbon 20 can always have a certain tension, such that the carbon ribbon 20 will not wrinkle to ensure the smooth operation of the printer.

Figure 8:
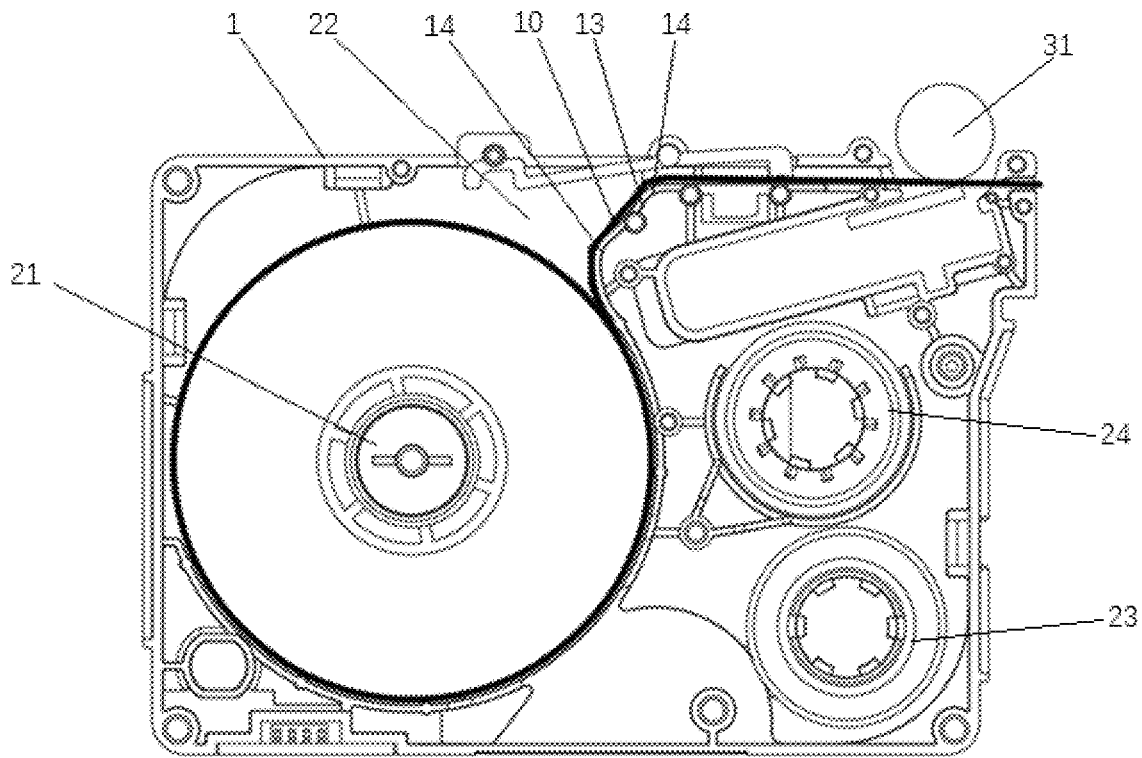
FIG. 8 is a schematic structural diagram of a continuous label paper roll in the label cartridge of the present disclosure when label paper is guided.

Referring to FIG. 8, when the label printer of the present embodiment is configured for printing of a continuous label paper roll, the continuous label paper roll is wound with the continuous label surface paper facing outward to prevent the label surface paper from warping and ensure the fit between the label surface paper and the base paper. The continuous label surface paper side of the continuous label paper roll is guided to contact each of the arc-shaped protrusions 14 of the concave arc-shaped guide plate in sequence, and enter the label paper output channel. In this way, the continuous label surface paper will be rolled by the two arc-shaped protrusions 14 in sequence in the advancing and paper output process, which further ensures the fit between the label surface paper and the base paper, prevents the folding and sticking phenomenon caused by the wrinkling of the label surface paper in the label paper printing process, and improves the label printing effect.

Figure 9:
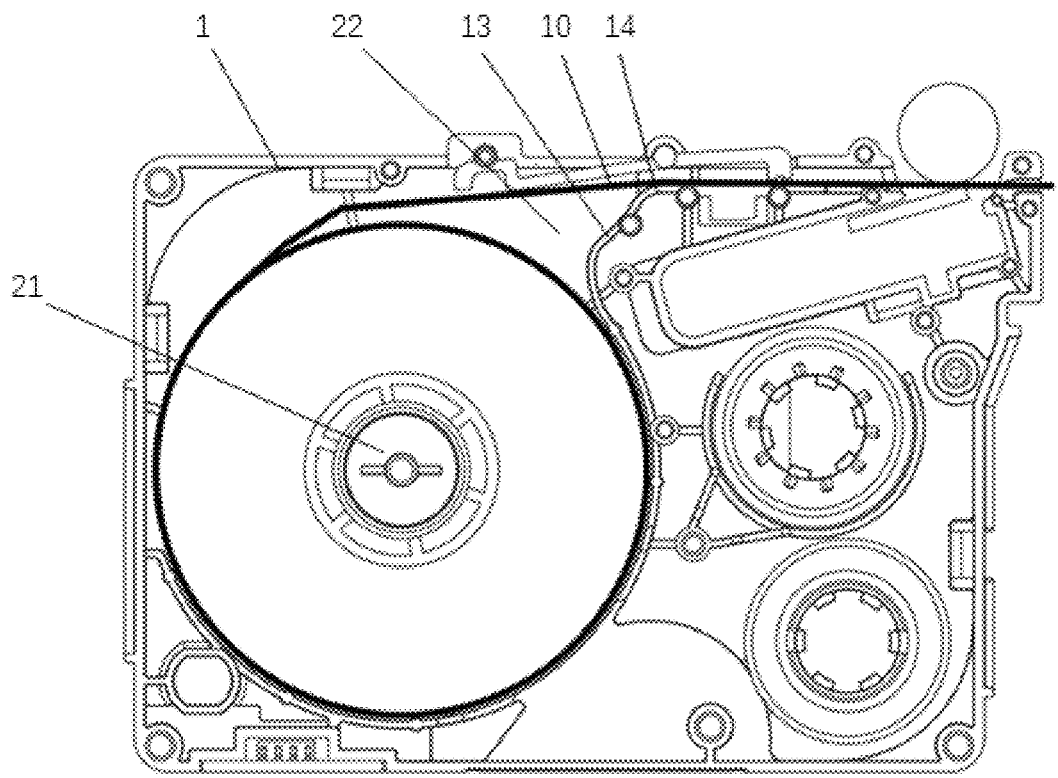
FIG. 9 is a schematic structural diagram of a die-cut label paper roll in the label cartridge of the present disclosure when label paper is guided.

Referring to FIG. 9, when the label printer is configured for printing of a die-cut label paper roll, the die-cut label paper roll is wound into a roll with a die-cut label surface paper facing inward to prevent the label paper from warping. The die-cut label surface paper side of the die-cut label paper roll is guided to contact with an arc-shaped protrusion 14 of the concave arc-shaped guide plate, and enter the label paper output channel. In this way, the die-cut label surface paper will still be rolled by the arc-shaped protrusion in the advancing and paper output process, which further ensures the fit between the die-cut label surface paper and the base paper, prevents the folding and sticking phenomenon caused by the wrinkling of the die-cut label surface paper in the label sticker printing process, and improves the label printing effect.

Figure 10:
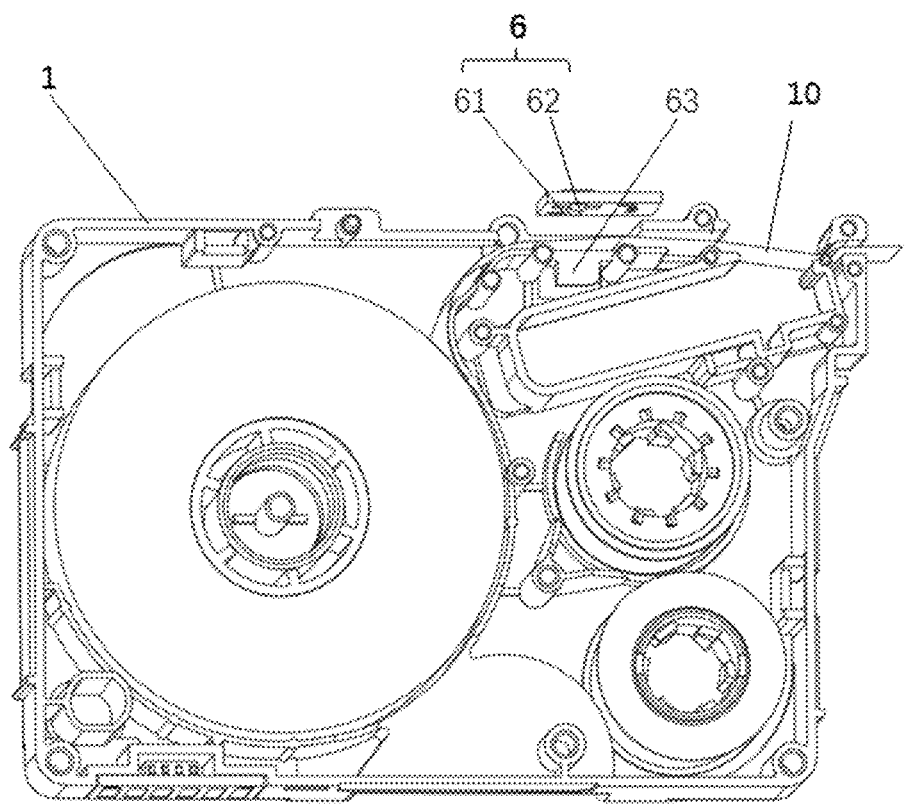
FIG. 10 is a schematic structural diagram of a photoelectric sensing mechanism of the label cartridge of the present disclosure.

In order to realize precise positioning of the die-cut label paper, a photoelectric sensing mechanism configured to detect a label is also arranged inside the outer shell 3. Referring to FIG. 10, the photoelectric sensing mechanism in the present embodiment includes a photoelectric sensor 6 with a transmitting terminal 61 and a receiving terminal 62 on a same side of the label paper 10, and a reflecting prism 63 arranged on the other side of the label paper 10. After passing through the label paper 10 vertically, a light beam emitted by the transmitting terminal 61 of the photoelectric sensor 6 is reflected by the reflecting prism 63, then passes through the label paper 10 vertically, and is received by the receiving terminal 62. Through the change of the detected voltage value, the die-cut label surface paper on the label paper 10 is detected to determine a spacing between the die-cut label surface paper and a starting end of the die-cut label surface paper.

Specifically, the reflecting prism 63 is arranged inside the label cartridge 1 and is located on the label surface paper side of the label paper 10. The photoelectric sensor 6 is arranged at a certain fixed position on the printer outside the side wall of the shell of the label cartridge 1, and is located on the base paper side of the label paper 10. The reflecting prism 63 uses a total reflecting prism, which can realize 180-degree reflection of the light beam emitted by the transmitting terminal 61.

Moreover, a distance from a projected position of the light beam emitted by the photoelectric sensor 6 on the label paper 10 to a position of the heating line of the print head 2 should be less than or equal to a length of the shortest die-cut label on the label paper 10 to avoid that the shortest die-cut label cannot be recognized, which is conducive to precisely calculating the moving distance of the die-cut label, and precisely starting the print head.

In order to precisely cut the label paper after printing, a cutter is further arranged inside the outer shell 3. The photoelectric sensing mechanism, the print head 2, and the cutter are arranged on the label paper output channel in sequence. A distance between the photoelectric sensing mechanism and the print head 2 is less than or equal to the length of a single die-cut label. A set distance between the print head 2 and the cutter is the sum of a spacing between the die-cut labels and a minimum margin of label printing minus a distance from a label cutting end to a rear end of the die-cut label.

In order to improve the printing effect of the die-cut label, the minimum margin of the label printing is 2 mm, and the minimum up and down adjustment printing position of the label is 1 mm. The minimum distance from the label cutting end to the rear end of the die-cut label is 1 mm.

On the basis of the above structure of the label printer, the label printer can realize the precise positioning of the die-cut label in continuous operation, and the label printing method for precise positioning is as follows.

First, the label printer controls the die-cut label to output paper forward at a constant speed. The control mechanism calculates a time t1 when a front end of the die-cut label reaches the print head according to a label paper output rate, calculates a time t2 when a printing starting position of the die-cut label reaches the print head, and calculates a time t3 required by a sum of a distance from the front end of the die-cut label to the rear end of the die-cut label and a distance from the label cutting end to the rear end of the die-cut label. After the above time points are determined, the following printing steps are started.

Figure 11:
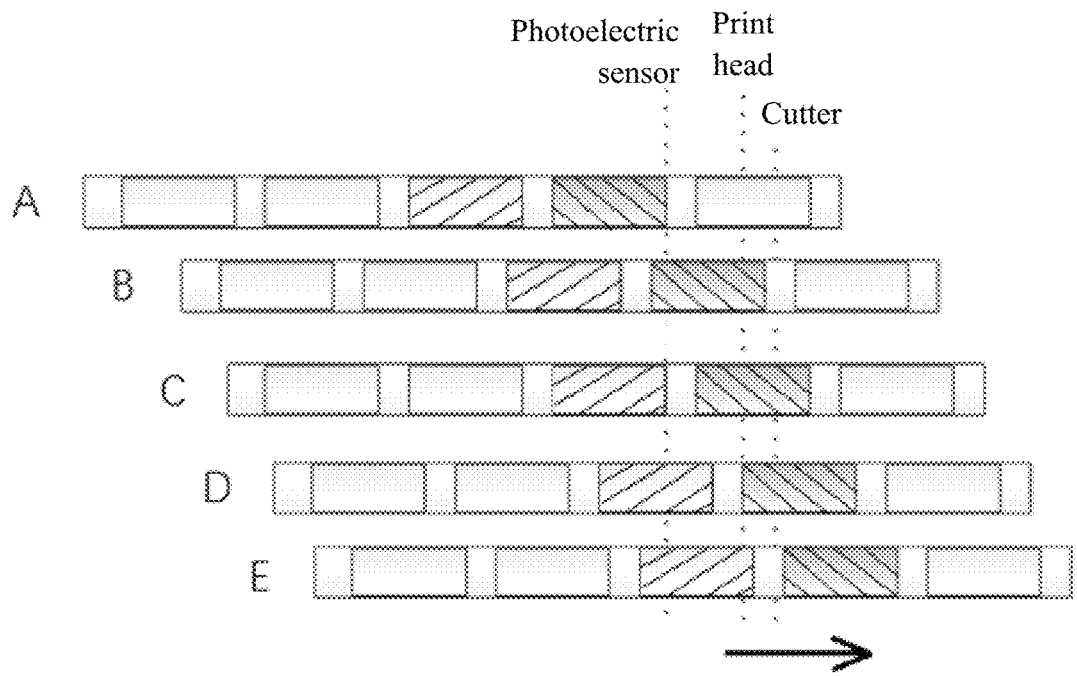
FIG. 11 is a schematic diagram of a label printing method for precise positioning of a label printer of the present disclosure.

Referring to FIG. 11, when the front end of the die-cut label in a paper output direction is detected by the photoelectric sensing mechanism, timing is started, as shown in a state A in FIG. 11. When the label continues to advance for time t1+t2, it is indicated that the printing starting position of the die-cut label is just at the heating line of the print head 2, and the control mechanism controls the print head 2 to start a printing action, as shown in a state B in FIG. 11. In the printing process, the photoelectric sensing mechanism simultaneously detects the front end position of the next die-cut label, as shown in a state C in FIG. 11. After the label printing is completed, the paper is output continuously, as shown in a state D in FIG. 11. At this time, the timing t3 is started when the front end of the die-cut label is detected, and the control mechanism can control the cutter to perform a cutting action, such as a state E in FIG. 11, to complete the cutting of a label.

In the continuous printing process, timing is started with the front end of the next die-cut label detected by the photoelectric sensing mechanism, the above printing action and cutting action are repeated in states A to E, and the continuous automatic printing and cutting of the die-cut label can be realized in sequence. The printing method for precise positioning can realize the precise printing positioning of the die-cut label and the positioning of the cutter, such that the position of the printed content on each die-cut label is precise, and the cutter will not cut the label surface paper when cutting the die-cutting label. The method is simple, stable and reliable.

Based on the above structure of the label printer, the working principle of the label printer is as follows: when printing is started, if the heating line of the print head 2 is in the position to be printed, the power mechanism drives the printing rubber roll 31 that is in close contact with the label paper 10 to rotate, and drives the label paper 10 to advance relying on the friction between the rubber roller 31 and the label paper 10. At the same time, the power mechanism drives the carbon ribbon take-up roll 24 to rotate actively to realize the forward take-up of the carbon ribbon 20, and controls the printing action of the print head 2 when the label paper 10 and the carbon ribbon 20 advance synchronously. When printing is started, the heating line of the print head 2 is not in the position to be printed, the power mechanism drives the printing rubber roll 31 that is in close contact with the label paper 10 to rotate reversely, and drives the label paper 10 to roll back relying on the friction between the rubber roller 31 and the label paper 10, and the label paper rolled back is released in the label rollback release space 22. At the same time, the power mechanism drives the carbon ribbon supply roll 23 to rotate actively to realize the reverse take-up of the carbon ribbon 20 and the synchronous rollback of the label paper 10 and the carbon ribbon 20 until the position to be printed of the label paper 10 is at the heating line of the print head 2, reversing is stopped, and the normal printing step is started.

The label printer of the present disclosure not only is suitable for the die-cut label paper rolls, but also realizes printing and cutting of the die-cut label paper rolls. It can also be configured for printing of continuous label paper rolls, heat shrinkable tube rolls, or labeling strip rolls, which meets the printing and cutting of various label materials, and has a wide range of application and good economy.

It should be noted that, in the description of the present disclosure, orientations or position relationships indicated by terms such as "upper", "lower", "front", and "rear" are based on the drawings. These terms are merely used to facilitate description of the present disclosure and simplify the description, rather than to indicate or imply that the mentioned apparatus or elements must have a specific orientation and must be established and operated in a specific orientation. Therefore, these terms should not be understood as a limitation to the present disclosure.

In the description of the present disclosure, it should be noted that, unless otherwise clearly specified, meanings of terms "install", "connected with", and "connected to" should be understood in a board sense. For example, the connection may be a fixed connection, a removable connection, or an integral connection; may be a mechanical connection or an electrical connection; may be a direct connection or an indirect connection by using an intermediate medium; or may be intercommunication between two components. Those of ordinary skill in the art may understand the specific meanings of the above terms in the present disclosure based on the specific situation.

The above are only preferred embodiments of the present disclosure, and are not intended to limit the present disclosure in any form. Simple alterations, equivalent changes or modifications made by those skilled in the art make using the technical contents disclosed above fall within the scope of protection of the present disclosure.

What is claimed is:

1. A label printer, comprising:
    an outer shell,
    a label cartridge arranged inside the outer shell,
    a power mechanism,
    a control mechanism, and
    a print head configured to realize label printing,
    wherein the power mechanism and the control mechanism are configured to control paper output of the label cartridge and winding and unwinding of a carbon ribbon;
    wherein the label cartridge comprises an inner shell, a label paper output channel and a carbon ribbon channel, wherein the label paper output channel and the carbon ribbon channel are arranged inside the inner shell; an interior of the inner shell is divided into a first half area and a second half area; a label paper roll is provided at a lower part of the first half area, and a label rollback release space is reserved at an upper part of the first half area; a carbon ribbon supply roll and a carbon ribbon take-up roll are provided at a lower part of the second half area, and a groove configured to place the print head is provided at an upper part of the second half area, a center of the groove being arranged in a portion of the label cartridge above the carbon ribbon supply roll and the carbon ribbon take-up roll; the label paper output channel is arranged along an uppermost end of the second half area, and the label paper output channel is in linear correspondence with a paper output port on a side wall of the inner shell and a side wall of the outer shell; the carbon ribbon channel is arranged around the groove, and the carbon ribbon at an open end of the groove is tightly attached to a label paper;
    the power mechanism comprises an electric motor and a gear transmission system;
    the gear transmission system comprises:
        a first gear set in transmission connection with an output shaft of the electric motor,
        a planetary gear set in transmission connection with the first gear set,
        a printing rubber roll gear set being in transmission connection with the planetary gear set and configured to drive the label paper to move forward or reversely,
        a carbon ribbon winding gear, and
        a carbon ribbon unwinding gear,
    wherein the carbon ribbon winding gear and the carbon ribbon unwinding gear are selectively in transmission connection with the planetary gear set;
    the planetary gear set comprises a sun gear, a planetary gear meshed with the sun gear, and a planetary carrier connecting the sun gear and the planetary gear; the sun gear is driven by the first gear set to drive the planetary gear to rotate, and under an action of the planetary carrier, the planetary gear is meshed with the carbon ribbon winding gear or the carbon ribbon unwinding gear based on forward rotation or reverse rotation of the sun gear; and
    the printing rubber roll gear set in the gear transmission system is connected to a printing rubber roll; the printing rubber roll drives, through friction with the label paper, the label paper to move; the carbon ribbon winding gear is connected to the carbon ribbon take-up roll, and the carbon ribbon unwinding gear is connected to the carbon ribbon supply roll; when the electric motor rotates to one side, the first gear set transmits power to the planetary gear set, and the planetary gear set drives the printing rubber roll and the carbon ribbon take-up roll to rotate to realize output of the label paper and take-up of the carbon ribbon; when the electric motor rotates to an opposite side, the first gear set transmits reverse power to the planetary gear set, and the planetary gear set drives the printing rubber roll and the carbon ribbon supply roll to rotate to realize rollback of the label paper and recovery of the carbon ribbon, wherein the label cartridge is configured to use a continuous label paper roll and a die-cut label paper roll, and wherein when the label cartridge contains a continuous label paper roll the label paper follows a first path, and when the label cartridge contains a die-cut label paper roll the label paper follows a second path.

2. The label printer according to claim 1, wherein the label paper output channel is linearly arranged along an inner side of the side wall of the inner shell, the groove is arranged at an acute angle with the side wall of the inner shell, and the print head arranged inside the groove is in inclined contact with the carbon ribbon.

3. The label printer according to claim 2, wherein a support baffle configured to separate the first half area and the second half area is arranged inside the inner shell, an upper part of the support baffle is set as a concave arc-shaped guide plate with at least two arc-shaped protrusion segments, and each of the label paper output channel and the carbon ribbon channel is provided with a plurality of support columns or support rollers.

4. The label printer according to claim 3, wherein the label paper uses a continuous label paper roll or a die-cut label paper roll, and a label surface paper side of the continuous label paper roll or the die-cut label paper roll is at least in contact with one of the at least two arc-shaped protrusion segments of the concave arc-shaped guide plate.

5. The label printer according to claim 4,
wherein the continuous label paper roll is wound into a roll with continuous label surface paper facing outward, and a continuous label surface paper side of the continuous label paper roll is in contact with each of the at least two arc-shaped protrusion segments of the concave arc-shaped guide plate in sequence; or wherein the die-cut label paper roll is wound into a roll with a die-cut label surface paper facing inward, and a die-cut label surface paper side of the die-cut label paper roll is in contact with one of the at least two arc-shaped protrusion segments of the concave arc-shaped guide plate.

6. The label printer according to claim 1, wherein the planetary gear set is further provided with an elastic limit mechanism, and the elastic limit mechanism comprises an elastic limit member and a limit rod abutting against the elastic limit member; a first end of the elastic limit member is connected to a rear of the planetary carrier, and a second end of the elastic limit member pops out to an outer side of the planetary carrier to form a certain tension with the planetary carrier; the limit rod is fixed on the outer shell, and when the electric motor is stopped, the elastic limit member urges the planetary gear to be meshed with the carbon ribbon winding gear under an interference of the limit rod.

7. The label printer according to claim 1, wherein torsion springs rotating in opposite directions are respectively arranged inside the carbon ribbon winding gear and the carbon ribbon unwinding gear, and sawteeth configured to control rotation of each of the carbon ribbon supply roll and the carbon ribbon take-up roll are provided inside each of a spindle of the carbon ribbon supply roll and a spindle of the carbon ribbon take-up roll.

8. The label printer according to claim 1, wherein a photoelectric sensing mechanism configured to detect a label and a cutter configured to cut a label base paper after printing are arranged inside the outer shell; the photoelectric sensing mechanism, the print head, and the cutter are arranged on the label paper output channel in sequence; a distance between the photoelectric sensing mechanism and the print head is less than or equal to a length of a single die-cut label, and a set distance between the print head and the cutter is a sum of a spacing between die-cut labels and a minimum margin of label printing minus a distance from a label cutting end to a rear end of the die-cut label.

9. The label printer according to claim 8, wherein the photoelectric sensing mechanism comprises:
a photoelectric sensor with a transmitting terminal and a receiving terminal on a same first side of the label paper, and
a reflecting prism arranged on a second side of the label paper;
wherein after passing through the label paper vertically, a light beam emitted by the transmitting terminal of the photoelectric sensor is reflected by the reflecting prism, then passes through the label paper vertically and is received by the receiving terminal to detect a label surface paper.

10. The label printer according to claim 1, wherein the label printer is configured for printing of die-cut label paper rolls, continuous label paper rolls, heat shrinkable tube rolls, or labeling strip rolls.

11. A label printing method for precise positioning of a label printer, wherein the label printer according to claim 8 is used, and the label printing method comprises the following steps:
controlling, by the label printer, the die-cut label to output a paper forward at a constant speed; calculating, by the control mechanism, a time t1 when a front end of the die-cut label reaches the print head according to a label paper output rate, calculating a time t2 when a printing starting position of the die-cut label reaches the print head, and calculating a time t3 required by a sum of a distance from the front end of the die-cut label to the rear end of the die-cut label and a distance from the label cutting end to the rear end of the die-cut label; and when the front end of the die-cut label in a paper output direction is detected by the photoelectric sensing mechanism, starting timing; and at a time t1+t2, controlling the print head to start a printing action, continuing to output the paper after printing is completed, starting timing when the front end of the die-cut label is detected, and controlling the cutter to perform a cutting action at the time t3.

12. The label printing method for precise positioning according to claim 11, further comprising: in a process of printing the die-cut label by the print head, detecting, by the photoelectric sensing mechanism, a front end position of a next die-cut label, and repeating the printing action and the cutting action when the front end position of the next die-cut label is detected.

13. A label printing method for precise positioning of a label printer, wherein the label printer according to claim 9 is used, and the label printing method comprises the following steps:
controlling, by the label printer, the die-cut label to output a paper forward at a constant speed; calculating, by the control mechanism, a time t1 when a front end of the die-cut label reaches the print head according to a label paper output rate, calculating a time t2 when a printing starting position of the die-cut label reaches the print head, and calculating a time t3 required by a sum of a distance from the front end of the die-cut label to the rear end of the die-cut label and a distance from the label cutting end to the rear end of the die-cut label; and when the front end of the die-cut label in a paper output direction is detected by the photoelectric sensing mechanism, starting timing; and at a time t1+t2, controlling the print head to start a printing action, continuing to output the paper after printing is completed, starting timing when the front end of the die-cut label is detected, and controlling the cutter to perform a cutting action at the time t3.

14. The label printer according to claim 1, wherein the carbon ribbon take-up roll is arranged in the inner shell above the carbon ribbon supply roll.

15. The label printer according to claim 1, wherein a photoelectric sensing mechanism configured to detect a label and a cutter configured to cut a label base paper after printing are arranged inside the outer shell.

* * * * *